July 17, 1923.
L. C. ACCOLA
TRAP
Filed July 24, 1922
1,461,743
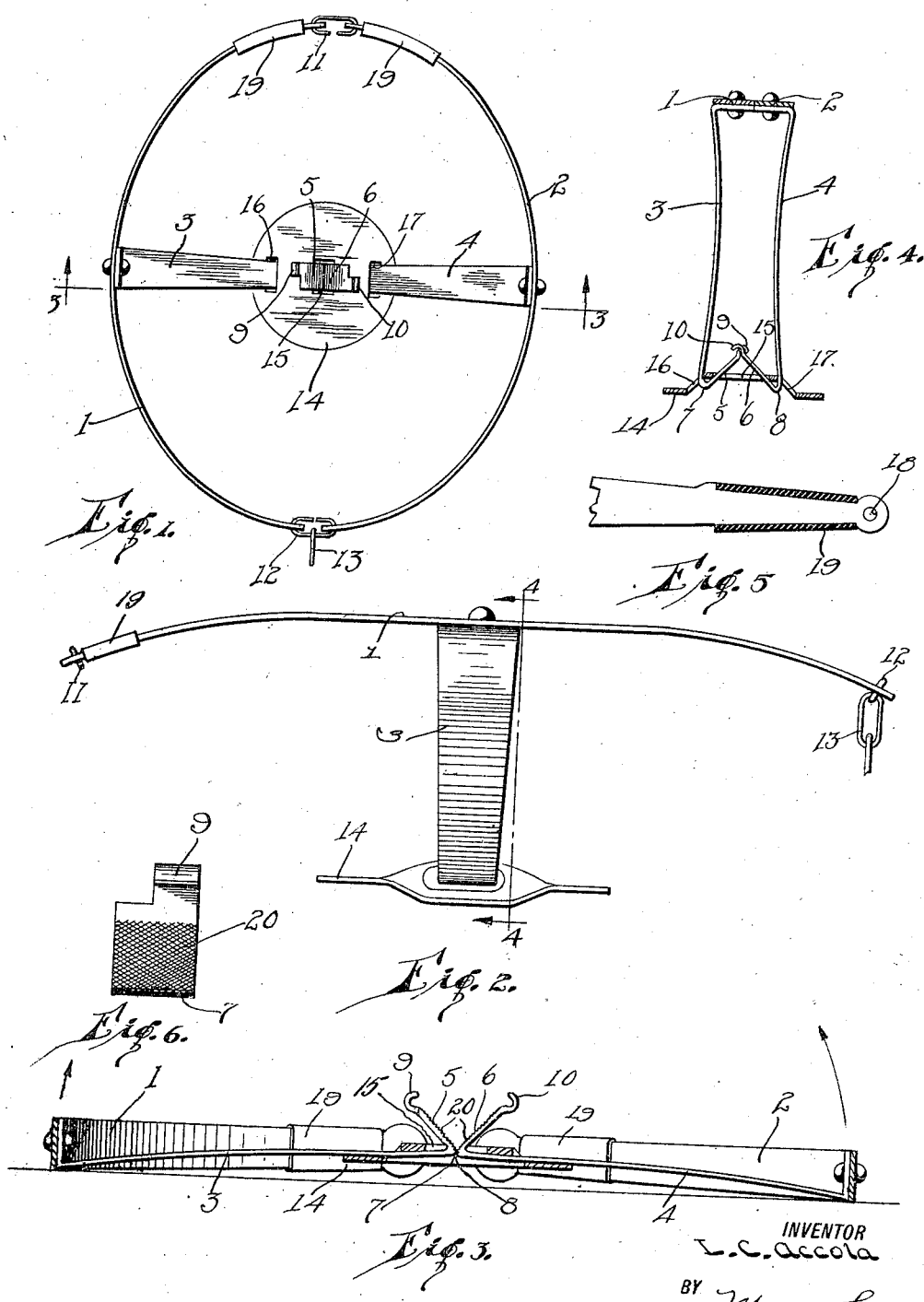
INVENTOR
L. C. Accola
BY Munn & Co.
ATTORNEYS Patented July 17, 1923.

1,461,743

UNITED STATES PATENT OFFICE.

LORENZ C. ACCOLA, OF CANTON, MISSOURI.

TRAP.

Application filed July 24, 1922. Serial No. 577,114.

*To all whom it may concern:*

Be it known that I, LORENZ C. ACCOLA, a citizen of the United States, and a resident of Canton, in the county of Lewis and State of Missouri, have invented a new and useful Improvement in Traps, of which the following is a full, clear, and exact description.

My invention relates to improvements in traps, and it consists in the combinations, constructions, and arrangements herein described and claimed.

An object of my invention is to provide a trap in which the clamping jaws also act as an actuating spring means for the trap.

A further object of my invention is to provide a device of the character described in which the jaws are locked in closed position when the trap is sprung.

A further object of my invention is to provide a device of the character described which has means for varying the spring tension of the trap.

A further object of my invention is to provide a device of the character described which is simple in construction, which is not likely to easily get out of order, and which is durable and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a plan view of the trap shown in opened position,

Figure 2 is a side elevation of the trap shown in closed position,

Figure 3 is a section along the line 3—3 of Figure 1,

Figure 4 is a section along the line 4—4 of Figure 2,

Figure 5 is a side elevation of a portion of the device, and

Figure 6 is an end elevation of another portion of the device.

In carrying out my invention, I provide two jaw members 1 and 2 which are made from spring steel. It is obvious that these members may be of any thickness or shape desired. In the present device I have shown the members as being widest at their mid points and tapering toward their ends. The jaws have extensions 3 and 4 which project laterally therefrom (see Figures 1 and 4).

The extensions or bars 3 and 4 have bent portions 5 and 6, respectively, adjacent to the free ends thereof and are secured to the jaws 1 and 2 by rivets or the like. When the trap is in opened position, the vertices 7 and 8 of the bars 3 and 4, respectively, are adapted to abut each other (see Figure 3). When the trap is in closed position, the hook-shaped portions 9 and 10 are adapted to lock with the portions 6 and 5, respectively (see Figure 4). The ends of the members 1 and 2 are secured to each other by links 11 and 12, the link 12 having a chain 13 secured thereto. In this manner, the trap is adapted to be secured to a stake (not shown) or the like.

The members 3 and 4 are held in operative engagement with each other by a plate 14. This plate has three openings 15, 16, and 17 therein. It will also be noted from Figures 3 and 4 that the central portion of the plate is raised with respect to the plate, thereby placing the opening 15 at a higher level than the openings 16 and 17. The adjacent ends of the members 1 and 2 have openings 18 therein (see Figure 5), through which the links, which connect the members together may be disposed. By disposing different sized links in the openings in the members 1 and 2, the spring tension of the trap may be readily varied at will. It will also be noted from Figure 5 that a sleeve or tubing 19 of a metal or resilient material is disposed over the tapered ends of the members 1 and 2, whereby the jaws will not come into contact with each other. This is the humane feature of the device, since it provides a means whereby the jaws will not closely grip the foot of the animal caught, but at the same time will prevent the animal from withdrawing its foot from the trap.

From the foregoing description of the various parts of the device, the operation thereof may be readily understood. In Figures 1 and 2, I have clearly shown the tension which the members 1 and 2 are put under when they are swung from closed position to opened position. It will be noted from Figure 2 that the jaws or members are practically straight, whereas in Figure 1, they form a complete ellipse. It is the natural tendency of the jaws 1 and 2 to resume the shape shown in Figure 2 and in order to do this, the jaws have to swing from opened position to closed position. This feature provides a very strong spring action to the trap without the necessity of providing a spring which is a customary element in the ordinary trap.

In setting the trap, the jaws 1 and 2 are forced from each other from the position shown in Figure 4 into the position shown in Figure 1. This movement causes the vertices 7 and 8 to abut one another and to swing the bars 3 and 4 into such a position that the vertices 7 and 8 are beyond the dead center line of the trap. This position is clearly shown in Figure 3, and it will be noted that the jaws 1 and 2 have a tendency to swing downwardly. This movement of course is prevented by the plate 14. The bars 3 and 4 are disposed in openings 16 and 17 and bear against the plate 14 in such a manner as to prevent the jaws 1 and 2 from swinging downwardly when the trap is in the position shown in Figure 2. When the trap is in opened position, the plate 14 is lifted from the supporting surface. When an animal steps on the plate 14 of the trap, it moves the plate downwardly, which causes the vertices 7 and 8 to swing beyond dead center. The spring jaws will now tend to straighten out into the position shown in Figure 2 and will swing toward each other in the direction of the arrows shown in Figure 3. As heretofore stated, this action is very strong, since the jaws are made of relatively heavy material. It is obvious that the heavier the thickness of the jaws, the greater the spring tension of the device, and the more secure the gripping action of the two jaws upon the foot of the animal.

When the trap is set, the plate 14 is disposed above the supporting surface and is therefore readily moved downwardly by the foot of the animal. An animal, when stepping on the plate 14, swings the vertices 7 and 8 beyond dead center, whereupon the spring tendency of the jaws 1 and 2 quickly swing the jaws into closed position. When the jaws are swung into closed position, the hook portions 9 and 10 lock with the portions 5 and 6 so as to prevent the lower ends of the members 3 and 4 from moving outwardly. In this manner, the jaws are held in closed position. In Figures 3 and 6 I have shown the adjacent surfaces of the portions 5 and 6 as being knurled as at 20. This construction prevents the portions 5 and 6 from slipping with respect to each other when the trap is set. It is obvious that although the trap has a very powerful spring action, a slight force will spring the trap, since the bars 3 and 4 are disposed close to dead center position when the trap is in opened position. The sleeves 19 prevent the jaws from closely engaging with each other, whereby the trap is not apt to sever the foot of the animal. The device is very simple in construction and provides a novel means whereby the jaws of the trap also act as the spring actuating means. The device is inexpensive to manufacture and consists of a minimum number of parts.

I claim:

1. A trap comprising two spring jaws pivotally secured to each other at their ends, integral bars carried by said jaws and adapted to be swung into substantial alinement with each other, and releasable means for holding said bars in opened position.

2. A trap comprising two spring jaws pivotally secured to each other at their ends, integral bars carried by said jaws and adapted to be swung into substantial alinement with each other, and releasable means for holding said bars in opened position, said bars locking with each other when said jaws swing into closed position.

3. A trap comprising two spring jaws adapted to be bent into a circle, arms carried by said jaws and being swung into substantial alinement with each other when said jaws are opened, and a plate adapted to releasably hold said jaws in opened position.

4. A trap comprising two spring jaws pivotally secured to each other at their ends, integral arms carried by said jaws and adapted to abut each other to hold said jaws in opened position, a plate for holding said arms in opened position, said plate being adapted to release said arms when moved downwardly, whereby said jaws will move into engagement with each other, and integral portions carried by said arms and adapted to lock with each other when said jaws are in closed position.

LORENZ C. ACCOLA.